(12) United States Patent
Greif et al.

(10) Patent No.: US 7,393,165 B2
(45) Date of Patent: Jul. 1, 2008

(54) CLAMPING DEVICE

(75) Inventors: Josef Greif, Friesenried (DE); Wolfgang Bechteler, Biessenhofen (DE)

(73) Assignee: Ott-Jakob GmbH & Co. Spanntechnik KG, Lengenwang (DE)

( * ) Notice: Subject to any disclaimer, the term of this patent is extended or adjusted under 35 U.S.C. 154(b) by 0 days.

(21) Appl. No.: 11/949,321

(22) Filed: Dec. 3, 2007

(65) Prior Publication Data

US 2008/0080944 A1   Apr. 3, 2008

Related U.S. Application Data

(62) Division of application No. 11/576,893, filed as application No. PCT/EP05/11052 on Oct. 14, 2005, now Pat. No. 7,320,567.

(30) Foreign Application Priority Data

Oct. 20, 2004 (DE) ................ 10 2004 051 031

(51) Int. Cl.
*B23C 5/26* (2006.01)
(52) U.S. Cl. ...................................... 409/233
(58) Field of Classification Search ......... 409/231–233; 408/239 R, 239 A, 240
See application file for complete search history.

(56) References Cited

U.S. PATENT DOCUMENTS

| | | | |
|---|---|---|---|
| 4,677,719 A * | 7/1987 | Link ................. | 409/233 |
| 4,708,547 A | 11/1987 | Baron | |
| 4,748,357 A | 5/1988 | Kempken | |
| 4,913,605 A | 4/1990 | Schwartzman | |
| 6,234,731 B1 * | 5/2001 | Sakamoto ............. | 409/233 |
| 7,249,919 B2 | 7/2007 | Dawidziak et al. | |
| 7,287,940 B2 * | 10/2007 | Feldmeier et al. .......... | 409/233 |
| 7,318,692 B2 * | 1/2008 | Herla .................. | 409/233 |

(Continued)

FOREIGN PATENT DOCUMENTS

DE   2 107 444   8/1972

(Continued)

OTHER PUBLICATIONS

Machine translation of DE-10101093, 4 pgs.

(Continued)

*Primary Examiner*—Erica E Cadugan
(74) *Attorney, Agent, or Firm*—Martin Fleit; Paul D. Bianco; Fleit Gibbons Gutman Bongini & Bianco P.L.

(57) ABSTRACT

The invention relates to a clamping device for clamping a tool (8), or tool holder in a working spindle (4), in particular, of a machine tool, comprising a drawbar (10), arranged to be displaced within the working spindle (4), a clamping set (12), arranged in the working spindle (4) and displaceable between a clamping position and a released position by means of the drawbar (10), a spring arrangement (14) provided for the drawbar (10) to generate the drawing force for the clamping set (12) and a releasing unit (17; 49), by means of which the clamping set (12) may be moved into the released position by the drawbar (10) against the force of the spring arrangement (14). According to the invention, a simplified operation of the clamping device may be achieved, whereby the releasing unit (17; 49) may be operated by an electrical actuator (62, 63, 53, 54).

6 Claims, 5 Drawing Sheets

U.S. PATENT DOCUMENTS

| | | | |
|---|---|---|---|
| 7,320,567 B2 * | 1/2008 | Greif et al. | 409/233 |
| 2005/0141976 A1 | 6/2005 | Feldmeier et al. | |

FOREIGN PATENT DOCUMENTS

| | | |
|---|---|---|
| DE | 41 23 834 | 2/1992 |
| DE | 100 43 006 | 4/2002 |
| DE | 101 01 093 | 7/2002 |
| DE | 101 60 705 | 6/2003 |
| DE | 10 2004 011 738 | 9/2005 |
| EP | 1570933 A2 | 9/2005 |
| JP | 06063806 | 3/1994 |
| SU | 524619 A * | 12/1978 |
| WO | WO-89/10226 A1 * | 11/1989 |

OTHER PUBLICATIONS

Machine translation of JP- 06-063806, 7 pgs.

Machine translation of DE- 4123834, 2 pgs.

* cited by examiner

CLAMPING DEVICE

CROSS REFERENCE TO RELATED APPLICATIONS

This application is a divisional of U.S. patent application Ser. No. 11/576,893, filed May 31, 2007 now U.S. Pat. No. 7,320,567, which is the U.S. National Stage Application of International Application No. PCT/EP05/11052, filed Oct. 14, 2005. The International Application claimed priority to German Patent Application No. 10 2004 051 031.8, filed Oct. 20, 2004.

FIELD OF THE INVENTION

The invention relates to a clamping device for clamping a tool or tool holder in a working spindle, in particular, of a machine tool.

BACKGROUND OF THE INVENTION

A clamping device of this type is known from DE 100 43 006 C1. There, the machine tools are held by mean of a clamping set arranged in the working spindle, which clamping set is arranged at the front end of a drawbar placed under prestress by means of a spring arrangement. The clamping set commonly comprises several radially movable gripper elements by means of which the machine tool is drawn into the working spindle. In order to release the machine tool, the drawbar is displaced by means of a releasing unit against the force of the spring arrangement, such that the clamping set with gripper elements is opened and releases the machine tool. The releasing unit comprises a hydraulically operated piston-cylinder arrangement by means of which the clamping set can be moved by the drawbar into the released position against the force of the spring arrangement. However, this necessitates relatively expensive supply aggregates and hook-ups or connections in order to supply the releasing unit with hydraulic fluid. In addition, special scaling measures must be provided.

Known from DE 101 01 093 A1 is a clamping device featuring an electric motor operating device to operate the drawbar. However, no spring arrangement is provided to generate the drawing force of the clamping set for this known clamping device.

The problem of the invention is to create a clamping device of the aforementioned type that enables simplified operation.

SUMMARY OF THE INVENTION

Expedient improvements and advantageous configurations of the invention are indicated in the subordinate claims.

For the clamping device according to the invention, the releasing unit is operated by means of an electrical actuator such that no special hydraulic or pneumatic aggregates are required here. Also, expensive sealing measures can be waived.

The electrical actuator expediently comprises an electric motor and a linear gear unit that converts the rotational movement of the electric motor into a linear movement of a piston or other suitable component in order to displace the drawbar.

For the electric motor, this can be a matter of a separate motor, the stator and rotor of which are accommodated in a housing of the releasing unit. In an additional advantageous embodiment of the invention, the actuating motor provided for rotating the working spindle can be employed to actuate the linear gear unit. Here, an engageable coupling can be provided by means of which the working spindle can be connected to the linear gear unit in order to carry out a tool change.

In an expedient embodiment, the linear gear unit is executed as a threaded mechanism having a rotary driven spindle sleeve and an associated threaded spindle.

BRIEF DESCRIPTION OF THE DRAWINGS

Additional features and advantages of the invention are yielded from the following description of a preferred embodiment with the aid of the drawing. Shown are.

DETAILED DESCRIPTION OF THE INVENTION

Figure 1:
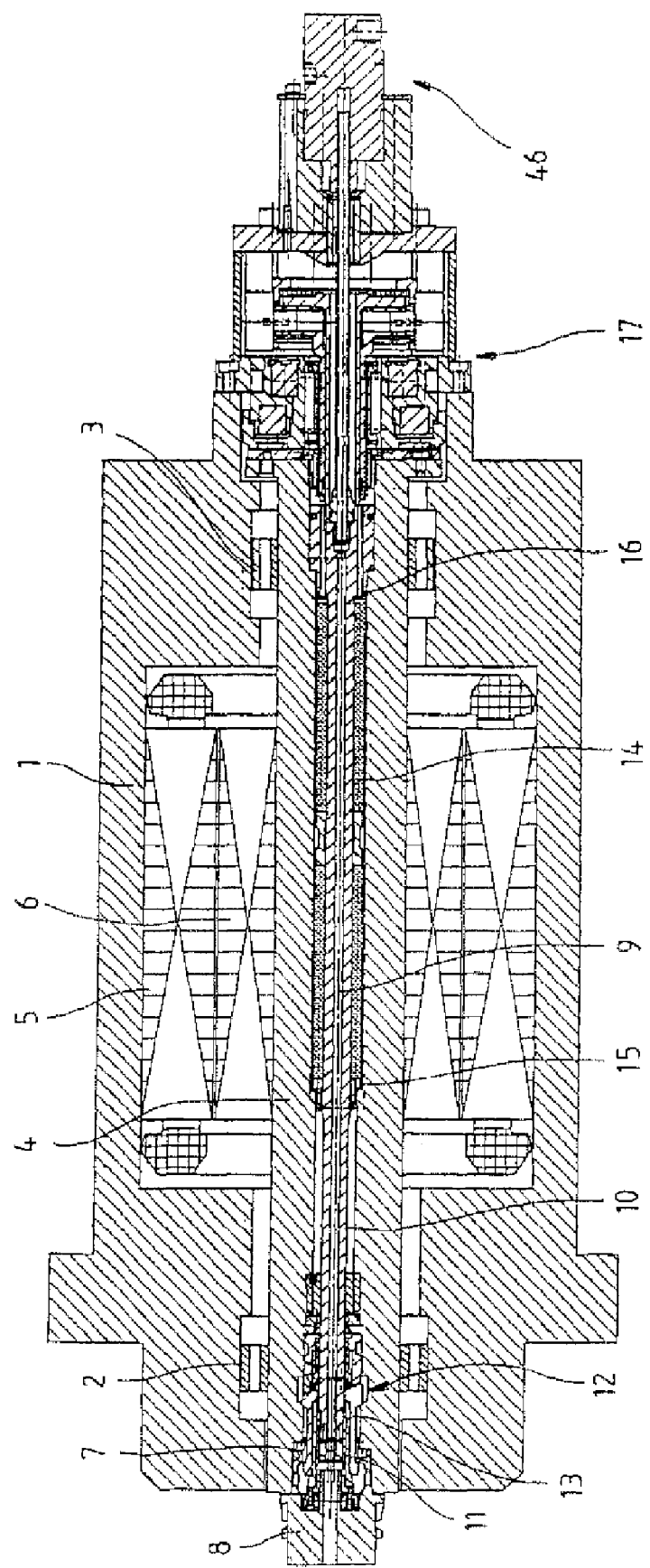
FIG. 1 An actuating unit of a machine tool having a clamping device in longitudinal section.

Shown in longitudinal section in FIG. 1 is an actuating unit executed as a motor spindle of a machine tool, having a spindle housing (1), a working spindle (4) rotationally mounted within the spindle housing (1) by means of bearings (2, 3), a stator (5) arranged in the spindle housing (1) and a rotor (6) arranged concentrically about the working spindle (4) and non-rotationally linked to same. The actuating motor formed of the stator (5) and rotor (6) is designed such that the working spindle (4) can be driven both at a high rotational speed as well as at a slight rotational speed and a higher level of positioning precision. The left front end in FIG. 1 of the working spindle (4) features a female taper (7) in order to receive a tool taper (8) on a tool or tool holder. In the embodiment shown, the tool taper (8) is executed as a hollow shank taper. A clamping device is integrated in the working spindle (4) in order to clamp a tool or tool holder.

The clamping device comprises a drawbar (10) within the working spindle (4), concentric to the centerline (9) thereof, to the front end of which drawbar is mounted a clamping taper (11) of a known clamping set (12). The clamping set (12) comprises a collet chuck, arranged about the clamping taper (11), having several gripper elements (13) that can be moved radially by axially displacing the clamping taper (11) in order to clamp or release the tool taper (8). The drawbar (10) is placed tinder a backward prestress by means of a spring arrangement (14) arranged concentrically about said drawbar. The spring arrangement (14) executed here as a disk spring package is supported at one side by a contact disk (15) supported within the working spindle (4) and at the other side by a collar (16) located at the rear end of the drawbar (10). The drawbar (10) is of a hollow execution in order to supply a working fluid to the tool taper (8). Arranged at the rear end of the drawbar (10) is an electrically actuated releasing unit (17)—expounded upon in the following—by means of which the drawbar (10) can be pressed forward against the force of the spring arrangement (14). If the drawbar (10) is pressed forward, the clamping set (12) arranged at the front end of the working spindle (4) releases the tool taper (8) of the tool or tool holder. If, in contrast, the drawbar (10) is again drawn backward by means of the force of the spring arrangement (14), the tool taper (8) is drawn into the working spindle (4)

and clamped. The construction and mode of operation of the clamping set (12) as such are known, so that an exhaustive description can be avoided.

Figure 2:
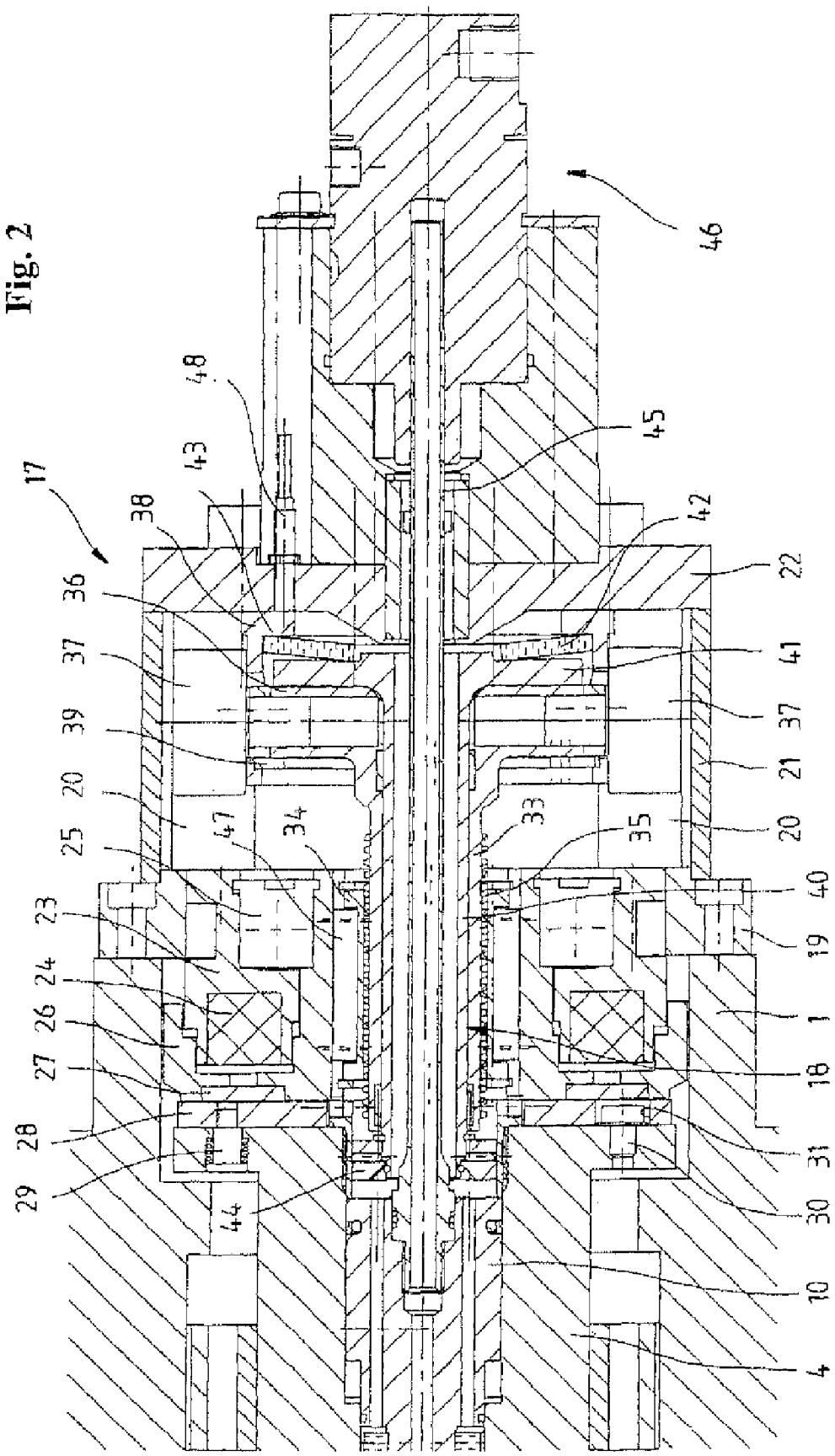
FIG. 2 An enlarged longitudinal section of a releasing unit of the clamping device shown in FIG. 1 in a clamping position.
Figure 3:
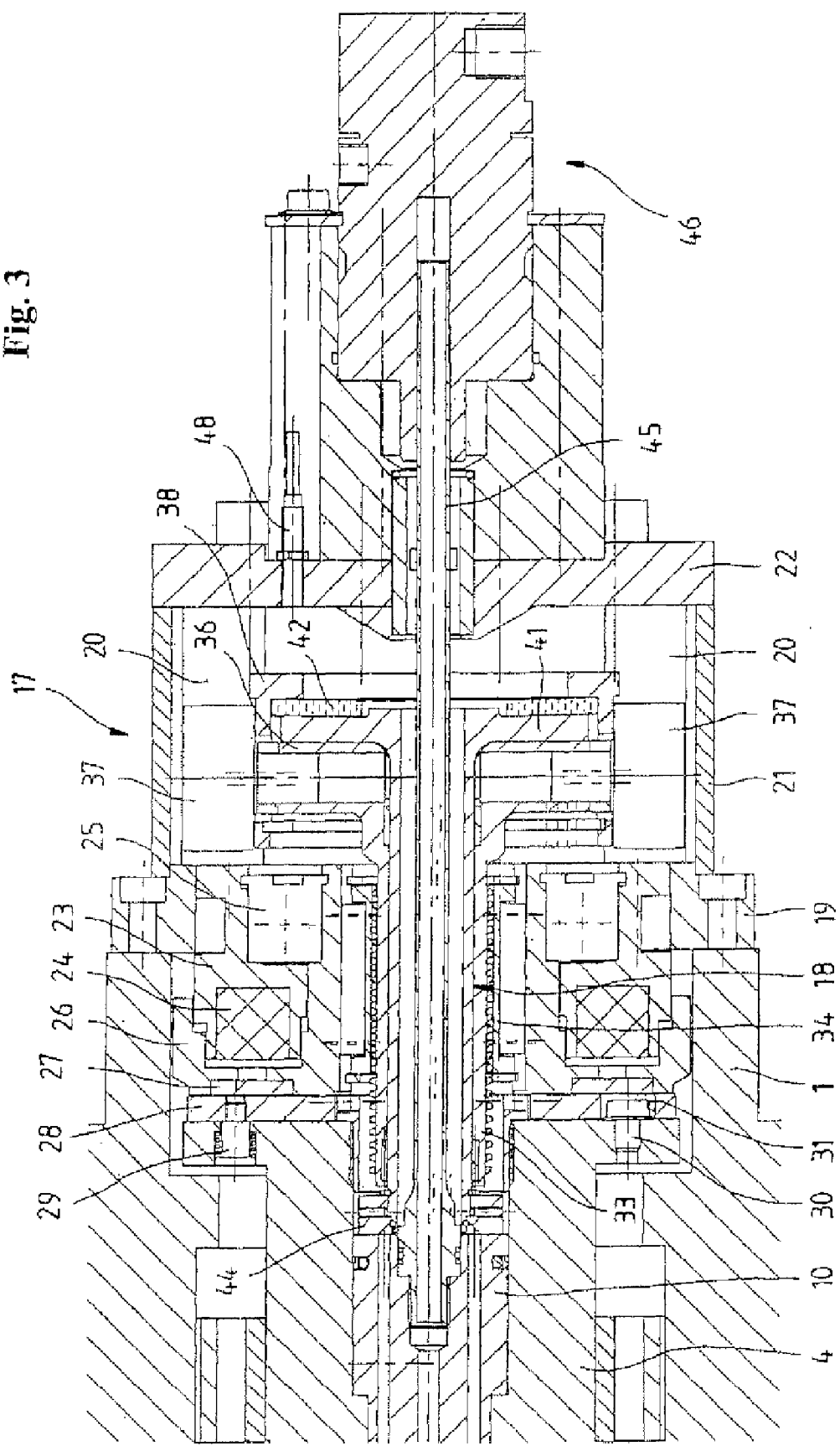
FIG. 3 An enlarged longitudinal section of a releasing unit of the clamping device shown in FIG. 1, in a released position.

FIGS. 2 and 3 show an enlarged longitudinal section of the releasing unit (17) on the actuating unit represented in FIG. 1, in a clamping position and released position. The releasing unit (17) comprises an axially displaceable piston (18) that, in order to operate the drawbar (10) by means of the powered rotating working spindle (4), is arranged by means of an engageable coupling and a linear gear unit to be able to be displaced axially within a housing non-rotationally linked with the spindle housing (1). The housing includes a front housing part (19) having supporting surfaces (20), a covering tube (21) and a rear housing part (22). The front housing part (19) is screwed together by means of a ring flange to the spindle housing (1). The axially displaceable piston (18) is able to displace the drawbar (10) against the force of the spring arrangement (14).

The engageable coupling comprises a coil body (23), non-rotationally arranged within the front housing part (19), in which coil body is arranged a coil (24). The engageable coupling moreover comprises an armature element (26), rotationally mounted within the coil body (23) by means of a bearing (25), the front face of which armature element features a friction lining (27) that engages with a friction ring (28) arranged at the rear face of the working spindle (4). The friction ring (28) is drawn by means of several spring-loaded tension bolts (29) axially to the rear face of the working spindle (4). Several screws (30) and corresponding pull-in holes (31) secure the friction ring (28) against rotation, yet connect same in an axially movable way to the working spindle (4).

For the embodiment shown, the linear gear unit is executed as a threaded mechanism having a hollow threaded spindle (33) and an associated spindle sleeve (34) that are connected to one another by means of a motional thread (35) executed, e.g., as a trapezoidal thread. The spindle sleeve (34) is connected to the rotating armature (26) in a positive and axially secured way by means of fit-in keys (47). The threaded spindle (33) includes a rear support section (36) of an enlarged diameter in which are arranged radially projecting support bodies (37). For the embodiment shown, the support bodies (37) are executed as rotationally mounted support rollers. Said support bodies (37) support the threaded spindle (33) by the support surfaces (20) of the stationary front housing part (19) such that said threaded spindle is axially movable, yet secured against rotation. The rear support section (36) of the threaded spindle (33) is arranged in a sleeve (38) and axially secured therein by means of a tension ring (39). The piston (18) includes a tube (40) progressing through the hollow threaded spindle (33) and a disk-shaped rear part (41), one face of which is supported against the rear side of the support section (36) and the other face of which is supported by means of a disk spring (42) or other spring against a collar (43) of the sleeve (38). The sleeve (38) entrains the piston (18) thus by the threaded spindle (33) during axial movement of the latter. Mounted to the front end of the piston (18) is an axial bearing (44), the rotating bearing ring of which comes into contact with the rear end of the drawbar (10) when the clamping device is released. Progressing through the hollow piston (18) is a connecting tube (45) that connects the drawbar (10) of hollow design for the supply of lubricant or compressed air to a known rotary feedthrough (46).

The mode of operation of the aforementioned clamping device is expounded upon in the following:

In order to carry out a tool change, first, in the clamping position represented according to FIG. 2, current is applied to the coil (24) while the working spindle (4) is stationary such that the friction ring (28) is drawn toward the coil (24) against the force of the spring-loaded tension bolts (29), and pressed against the friction lining (27). A corresponding control of the actuating motor then is used to rotate the working spindle (4) at a slower rotational speed, with the armature (26) and the spindle sleeve (34) non-rotationally linked thereto being rotated along with this by means of the engaged coupling. Since the threaded spindle (33) arranged within the spindle sleeve (34) is secured against rotation by means of the support bodies (37), said threaded spindle carries out an axial movement, by means of the rotation of the likewise axially secured spindle sleeve (34). In the process, it entrains, by means of the sleeve (38), the piston (18). In order to release the clamping device, the spindle sleeve (34) is rotated such that the threaded spindle (33) and piston (18) move in the direction of the drawbar (10) and displace same to a front released position represented in FIG. 3. The axial bearing (44) arranged at the front face of the piston (18) reduces the friction between the non-rotating threaded spindle (33) and the rotating drawbar (10) during their contact, The disk spring (42) mounted between the rear end (41) of the piston (18) and the collar (43) of the sleeve (38) provides for a spring suspension of the piston (18) if the drawbar (10) travels in the front released position against a fixed front limit stop and the working spindle continues to rotate somewhat despite the motor being switched off. This cushions and absorbs possible impacts during travel into the released position.

In order to tension the clamping device, the direction of rotation of the motor can again be reversed such that the piston (18) again travels to the rear position shown according to FIG. 2. In the process, the spring arrangement (14) again presses the drawbar (10) in the rear clamping position. Mounted at the rear housing part (22) is a limit switch (48) that switches off the motor if the sleeve (38) reaches the rear end position thereof. Here also the spring (42) again serves as a cushioning element if the sleeve (38) in the course or traveling back comes to a stop at the rear housing part (22) and the working spindle (4), despite the motor being switched off, continues to rotate somewhat due to inertia.

Figure 4:
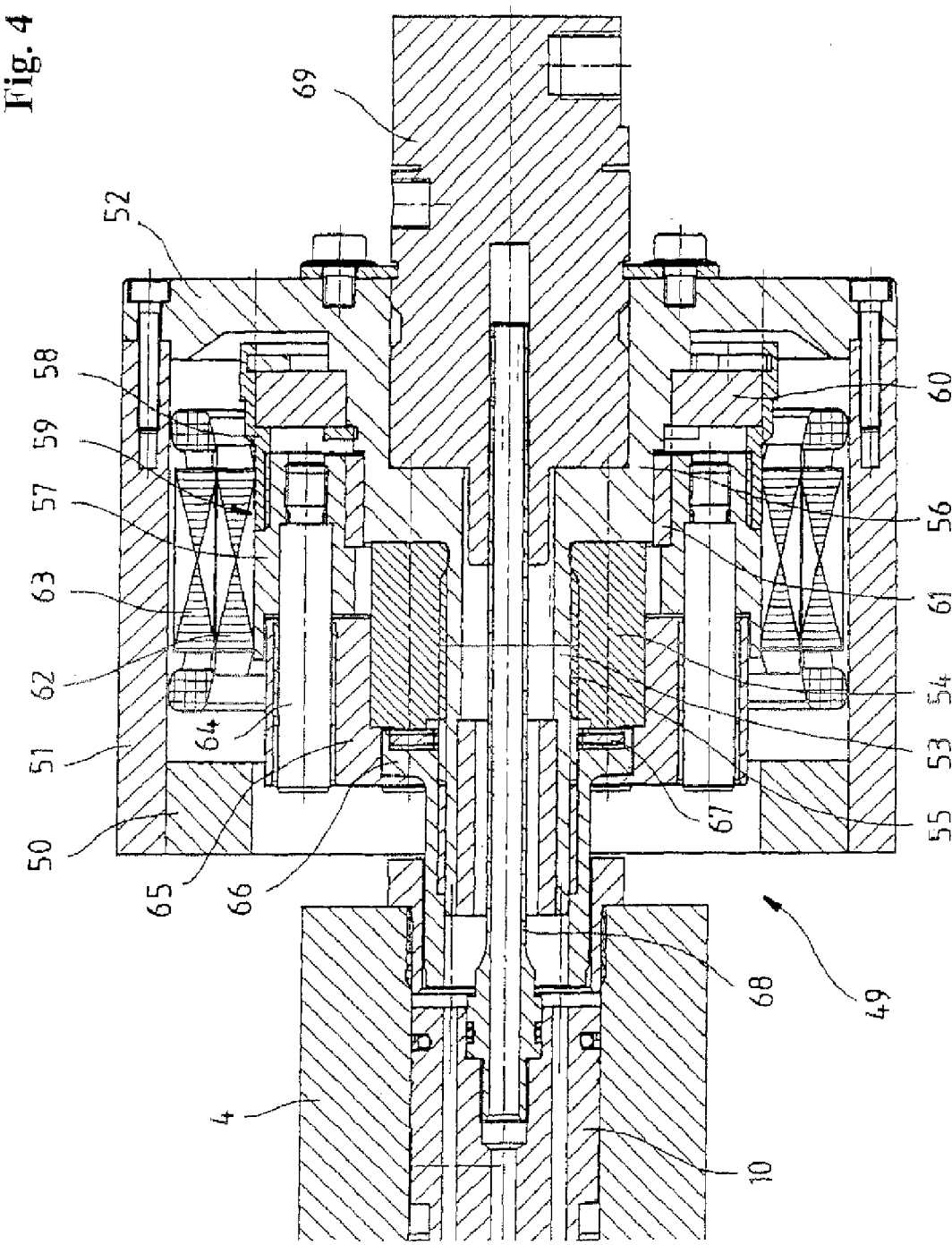
FIG. 4 An enlarged longitudinal section of an additional releasing unit in a clamping position and FIG. 5 An enlarged longitudinal section of the releasing unit shown in FIG. 4 in a released position.
Figure 5:
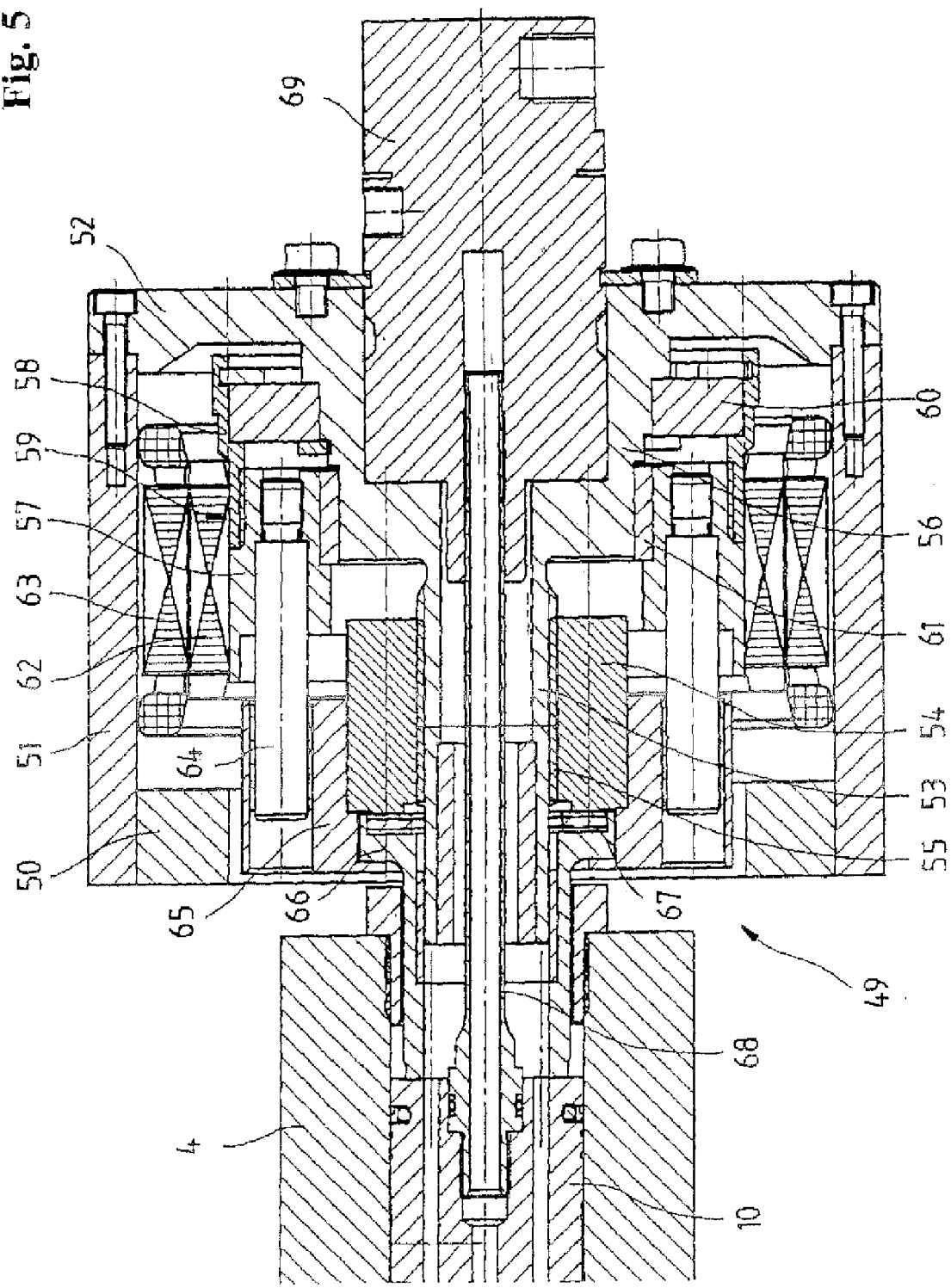

FIG. 4 shows an additional embodiment of an electrically operated releasing unit (49) to displace the drawbar (10) of a clamping device integrated in the working spindle (4) of a machine tool. The releasing unit (49) comprises a stationary housing having a ring-shaped front housing part (50), a covering tube (51) in a fixed connection with the former, and a rear housing part (52) screwed together with the covering tube (51). The rear housing part (52) has a threaded spindle (53) projecting forward, upon which is rotationally arranged a spindle sleeve (54) by means of a motional thread (55) executed, e.g. as a trapezoidal thread. On a bearing shoulder (56) of the rear housing part (52), an actuating bush (59) composed of a front part (57) and a rear part (58) is rotationally arranged by means of a rear bearing (60) and a front bearing bush (61).

The actuating bush (59) can be actuated by means of a motor having a rotor (62) arranged concentrically about said actuating bush (59) and non-rotationally linked thereto and a stator (63) concentrically enclosing said rotor. The stator (63) is accommodated in a fixed manner within the housing and concentrically encloses the rotor (62) arranged on the actuating bush (59). Several forward protecting transfer pins (64) are affixed in the front part of the actuating bush (59). A transfer ring (65) having corresponding bore holes is slipped on the transfer pins (64) in a way permitting axial displacement. A spindle sleeve (54) is non-rotationally fixed in the transfer ring (65). Additionally arranged in the transfer ring

(65) is a hollow piston (66) the rear face of which is rotationally supported by means of an axial bearing (67) against the front face of the spindle sleeve (54) and the front face of which comes into contact with the rear face of the drawbar (10) when the clamping device is released. Likewise progressing through the hollow-design housing part (52) and the hollow piston (66) is a connecting tube (68) that connects the drawbar (10) to a rotary feedthrough (69) in order to supply a coolant or lubricant. For this embodiment as well, the linear gear unit, in order to convert rotary movement of the motor to a linear movement is executed as a threaded mechanism having an actuated spindle sleeve (54) and a threaded spindle (53) provided for this. Here however, in contrast to the first embodiment, the threaded spindle (53) is stationary and the actuated spindle sleeve (54) is movable in the axial direction. If the spindle sleeve (54) is actuated by means of the motor via the actuating bush (59), the transfer ring (65) carries out an axial movement with the piston (66) arranged therein.

The clamping device according to the invention is not limited to the aforementioned embodiments. Thus, the clamping system according to the invention may find application not only for a hollow taper clamping system but also for a steep taper clamping system. The clamping set can be executed both in order to hold a tool having a hollow shank taper (HSK) as well as to hold a tool having a steep taper (SK) in the manner of a chuck or similar. In addition, an electric linear actuator also can be employed to actuate the releasing unit.

The invention claimed is:
1. Clamping device for clamping a tool (8), or tool holder in the front of a working spindle (4), comprising a drawbar (10) arranged to be displaced within the working spindle (4) along an axis, a clamping set (12) arranged in the working spindle (4) and displaceable between a clamping position and a released position by means of the drawbar (10), a spring arrangement (14) provided for the drawbar (10) to generate the drawing force for the clamping set (12) and a releasing unit (17) by means of which the clamping set (12) may be moved into the released position by the drawbar (10) against the force of the spring arrangement (14), characterized in that the releasing unit (17) may be operated by an electrical actuator (5, 6, 33, 34) including a motor (5, 6) for rotating the spindle (4) and a linear motion unit (33, 34), and in that the releasing unit (17) comprises an engageable coupling (23, 24, 26, 27, 28) including at least one part that is movable in the axial direction via a coil (24) and an armature (26) of the coupling, by means of which axial movement the working spindle (4) can be connected to the linear motion unit (33, 34).

2. Clamping device according to claim 1, characterized in that the engageable coupling (23, 24, 26, 27, 28) features a non rotationally arranged coil body (23) having the coil (24) and the armature (26), rotationally mounted within the coil body (23), and the front face of the armature comprises a friction lining (27) to engage with a friction ring (28) at the rear face of the working spindle (4).

3. Clamping device according to claim 1 characterized in that the linear motion unit (33, 34) comprises a spindle sleeve (34) linked to the armature (26) for rotation therewith and a threaded spindle (33) secured against rotation.

4. Clamping device according to claim 3, characterized in that the threaded spindle (33) is secured against rotation by means of support rollers (37), yet is supported to be axially movable on support surfaces (20) of a housing part (19) of the releasing unit (17).

5. Clamping device according to claim 3, characterized in that arranged in the threaded spindle (33) is a piston (18), which can be axially displaced with the threaded spindle (33) by means of a sleeve (38).

6. Clamping device according to claim 5, characterized in that the piston (18) is placed under axial prestress opposite the sleeve (38) by means of a spring (42).

* * * * *